United States Patent
Chaskar et al.

(10) Patent No.: US 7,280,505 B2
(45) Date of Patent: Oct. 9, 2007

(54) METHOD AND APPARATUS FOR PERFORMING INTER-TECHNOLOGY HANDOFF FROM WLAN TO CELLULAR NETWORK

(75) Inventors: Hemant Chaskar, Woburn, MA (US); Govind Krishnamurthi, Arlington, MA (US); Dirk Trossen, Cambridge, MA (US)

(73) Assignee: Nokia Corporation, Espoo (FI)

( * ) Notice: Subject to any disclaimer, the term of this patent is extended or adjusted under 35 U.S.C. 154(b) by 15 days.

(21) Appl. No.: 10/600,156

(22) Filed: Jun. 19, 2003

(65) Prior Publication Data

US 2004/0090937 A1   May 13, 2004

Related U.S. Application Data

(60) Provisional application No. 60/425,801, filed on Nov. 13, 2002.

(51) Int. Cl.
*H04Q 7/00* (2006.01)
(52) U.S. Cl. .................................. 370/331; 370/401
(58) Field of Classification Search ............... 370/331, 370/338, 352–356, 401; 455/432.1, 436–439; 713/168, 171
See application file for complete search history.

(56) References Cited

U.S. PATENT DOCUMENTS

| | | | |
|---|---|---|---|
| 6,137,791 A * | 10/2000 | Frid et al. | 370/352 |
| 6,243,581 B1 * | 6/2001 | Jawanda | 455/432.2 |
| 6,708,031 B2 * | 3/2004 | Purnadi et al. | 455/436 |
| 6,760,444 B1 * | 7/2004 | Leung | 380/270 |
| 6,876,640 B1 * | 4/2005 | Bertrand et al. | 370/331 |
| 6,904,055 B2 * | 6/2005 | Pichna et al. | 370/467 |

(Continued)

FOREIGN PATENT DOCUMENTS

JP   2003-333639   11/2003

(Continued)

OTHER PUBLICATIONS

Perkins et al, Mobile IP Joins Forces with AAA, IEEE, pp. 59-61, Aug. 2000.*

(Continued)

*Primary Examiner*—Frank Duong
(74) *Attorney, Agent, or Firm*—Harrington & Smith, PC

(57) ABSTRACT

A method, system and computer program are disclosed to perform a low latency inter-technology handoff of a MN from a WLAN to a cellular network. The method includes transmitting a Bearer Context from the MN for use by the cellular network, the Bearer Context containing information required to establish access network bearers in the cellular network for an ongoing Internet session of the MN; and responding to the Bearer Context with a Router Advertisement that is forwarded to the MN. The Bearer Context may be piggybacked on another message, or it may be sent as a separate message. The Bearer Context includes information expressive of: (a) a QoS requirement of an ongoing application or applications of the MN; (b) a unique identity of the MN that is recognizable by the cellular network; (c) parameters to facilitate the creation of a Point-to-Point Protocol state in the cellular network; and (d) parameters to enable establishment of packet filters in the cellular network. The method also includes authenticating and authorizing with the target cellular network for the purpose of executing handoff.

43 Claims, 4 Drawing Sheets

U.S. PATENT DOCUMENTS

| | | |
|---|---|---|
| 7,161,914 B2 | 1/2007 | Shoaib et al. ............... 370/331 |
| 7,173,924 B2 * | 2/2007 | Shaheen et al. ............ 370/338 |
| 2004/0008645 A1 * | 1/2004 | Janevski et al. ............ 370/331 |
| 2004/0081122 A1 | 4/2004 | Koodli et al. ............... 370/329 |
| 2004/0114553 A1 * | 6/2004 | Jiang et al. ................. 370/328 |

FOREIGN PATENT DOCUMENTS

| | | |
|---|---|---|
| WO | WO-03/101025 A2 | 12/2003 |
| WO | WO 2004/023249 | 3/2004 |

OTHER PUBLICATIONS

Srikaya et al, Packet Mode in Wireless Network : Overview of Transition to Third Generation, IEEE, pp. 164-172, Sep. 2000.*

3GPP2P.S0001, Wireless IP Network Standard, 3GPP2 Project, pp. 1-52, 1999.*

Karagiannis, Mobility Support for Ubiquitous Internet Access, ERICSSON, pp. 1-70, 2000.*

Xu et al, Mobile IP Based Micro Mobility Management Protocol in The Third Generation Wireless Network, Internet Draft, pp. 1-16, Nov. 2000.*

Choi et al, A Fast Handoff Scheme for Packet Data Service in the CDMA 2000 System, IEEE, pp. 1747-1753, 2001.*

Parikh et al, Seamless Handoff of Mobile Terminal from WLAN to cdma2000 Network, download at http://www.nokia.com/library/files/docs/Seamless_Handoff_of_Mobile_Terminal_from_WLAN_to_cdma2000_Network.pdf.*

Malki et al (Low Latency Handoff in Mobile IPv4, Internet Draft, pp. 1-65, May 2001.*

Pahlavan et al, Handoff in Hybrid Mobile Data Networks, IEEE, pp. 34-47, 2000.*

Tsao et al (Design and Evaluation of UMTS-WLAN Interworking Strategies, IEEE, pp. 777-781, Sep. 2002).*

Salberg, WLAN-GPRS Interworking, Graduate Thesis, pp. 1-50, May 2001.*

3rd Generation Partnership Project 2; "Wireless IP Network Standard" (3G PP2 P.S0001-A, version 3.0), Jul. 2001.

3rd Generation Partnership Project 2; "Wireless IP Architecture Based on IETF Protocols" (3G PP2 P.R0001, version 1.0.0), Jul. 2000.

IETF Mobile IP Working Group; "Low Latency Handoffs in Mobile IPv4", Jun. 2002.

IETF Mobile IP Working Group; "Fast Handovers for Mobile IPv6", Mar. 2003.

IETF Seamoby Working Group; "Issues in Candidate Access Router Discovery for Seamless IP-level Handoffs", Oct. 2002.

Malki et al., "Low Latency Handoff in Mobile IPv4", Internet Draft, May 2001, pp. 1-65.

Wu et al., "MIRAI Architecture for Heterogeneous Network," IEEE Communications Magazine, Feb. 2002, vol. 40, No. 2, pp. 126-134.

Watanabe et al., "Multimedia Integrated network by radio Access Innovation (MIRAI), A Combined WLAN and PHS Multi-service User Terminal," 2002 IEICE General Conference B-5-15.

* cited by examiner

METHOD AND APPARATUS FOR PERFORMING INTER-TECHNOLOGY HANDOFF FROM WLAN TO CELLULAR NETWORK

CLAIM OF PRIORITY TO PROVISIONAL PATENT APPLICATION

This patent application claims priority under 35 U.S.C. 119(e) from U.S. Provisional Patent Application No.: 60/425,801, filed Nov. 13, 2002, incorporated by reference herein in its entirety.

TECHNICAL FIELD

This invention relates generally to wireless communications systems and methods and, more specifically, relate to techniques for handing off a Mobile Node (MN) between wireless network providers that operate with different technologies, such as wireless local area network (WLAN) and a cellular network.

BACKGROUND

Cellular wireless technologies, such as cdma2000 and Universal Mobile Telecommunication System (UMTS), are expected to provide high speed wireless Internet connectivity to mobile users over a wide coverage area. At the same time, WLAN technologies, such as IEEE 802.11 and European HiperLAN, are becoming increasingly popular, as they provide a low cost and high speed wireless access solution for localized "hot spots". According to one prediction regarding the future of mobile networking, wide area cellular networks and WLANs will complement each other to provide mobile users with ubiquitous high-speed wireless Internet connectivity. In such an environment the mobile users can be expected to experience a need to seamlessly switch between the WLAN and the cellular network, even during an ongoing Internet session.

Mobile terminals, also referred to herein as mobile nodes, that combine different radio interfaces, such as cellular and WLAN, in one device will be available soon. Further, the development of mobility aware Internet protocols has picked up pace in recent years. These and other factors will combine and converge in the near future to provide enhanced mobile user features and connectivity. This will, however, require that the inter-technology handoff issues and problems be addressed and resolved., such as the inter-technology handoff from a WLAN to a cellular network. In particular, when the mobile node moves from WLAN to cellular network coverage it has been found that the WLAN signal fades very fast. As a result, the time and signal margin available for execution of handoff or handover procedures is very small.

The Internet Engineering Task Force (IETF) has developed a Mobile IP protocol to enable IP-layer handoffs during an ongoing Internet session. To minimize disruption to the mobile node's Internet connectivity during such handoffs, protocols such as Fast Handoff and Context Transfer are also under development. While these protocols provide the core framework for seamless inter-technology handoffs, additional effort is required to apply them to specific environments. Further, these protocols assume the existence of a "trusting" relationship between the source (e.g., WLAN) and destination (e.g., cdma2000) access networks, which is not always the case.

SUMMARY OF THE PREFERRED EMBODIMENTS

The foregoing and other problems are overcome, and other advantages are realized, in accordance with the presently preferred embodiments of these teachings.

This invention provides a method for inter-technology handoff of a mobile node from, in the preferred but not limiting environment, a WLAN to a cellular network. The handoff procedure incorporates enhancements to basic IP-layer handoff techniques in the following areas: (i) rapid set up of access network bearers in the cellular access network; and (ii) a dynamic authentication and authorization with the cellular network at the time of handoff.

The method advantageously requires no significant modification to existing cellular network protocol architectures. Further, the method is compatible with IP-layer handoff techniques such as low-latency Mobile IPv4 and fast Mobile IPv6.

A method, system and computer program are disclosed to perform a low latency inter-technology handoff of a MN from a WLAN to a cellular network. The method includes transmitting a Bearer Context from the MN for use by the cellular network, the Bearer Context containing information required to establish access network bearers in the cellular network for an ongoing Internet session of the MN; and responding to the Bearer Context with a Router Advertisement that is forwarded to the MN. The Bearer Context may be piggybacked on another message, or it may be sent as a separate message. The Bearer Context includes information expressive of: (a) a QoS requirement of an ongoing application or applications of the MN; (b) a unique identity of the MN that is recognizable by the cellular network; (c) parameters to facilitate the creation of a Point-to-Point Protocol state in the cellular network; and (d) parameters to enable establishment of packet filters in the cellular network. The method also includes authenticating and authorizing with the target cellular network for the purpose of executing handoff.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Those skilled in the art may appreciate that the following publications contain information related to this invention, and may be incorporated as necessary into this Patent Application in whole or in part: IETF MobileIP Working Group (www.ietf.org): Low Latency Mobile IPv4 and Fast Mobile IPv6 specifications; IETF Seamoby Working Group (www.ietf.org): Context Transfer Framework specification; 3GPP2 Specifications: "Wireless IP architecture based on IETF protocols" (3GPP2#P.R0001) and "Wireless IP Network Standard (3GPP2#P.S0001-A v3.0)", www.3gpp2.org; 3GPP2 Specification: "Access Network Interfaces Interoperability Specification", Revision A (3G-IOSv4.1), 3GPP2#A.S0001-A, www.3gpp2.org; 3GPP Specification: "QoS Concept and Architecture", TS 23.107, www.3gpp.org; and 3GPP Specification: "General Packet Radio Service: Service Description", TS 03.60, www.3gpp.org.

Figure 1:
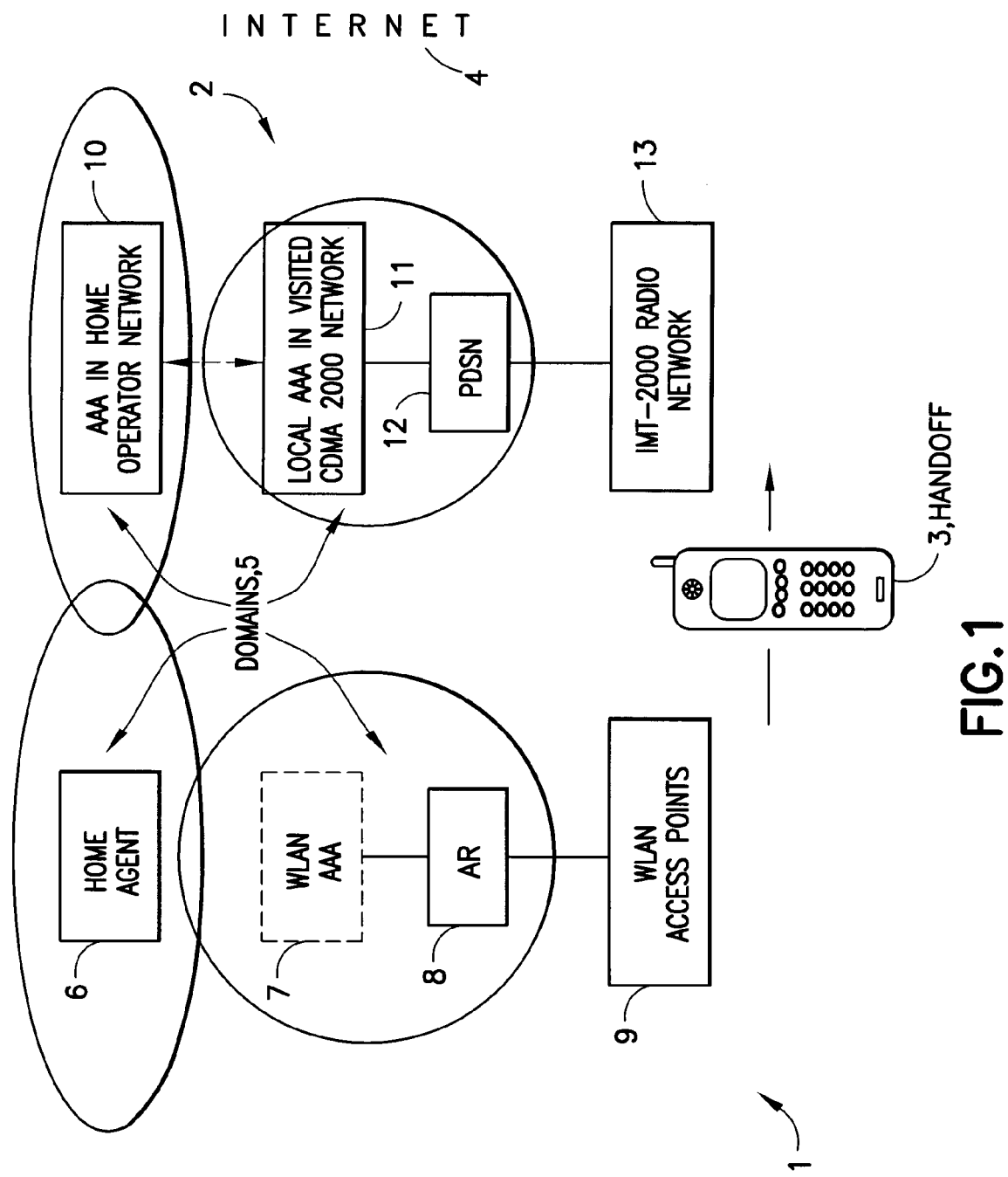
FIG. 1 is a simplified block diagram of a first, most preferred, embodiment of a reference network architecture, and is illustrative of one suitable type of multi-technology wireless system architecture in which this invention can be deployed to advantage.

FIG. 1 shows a reference network deployment embodiment, also referred to as an independent AAA (Authentication, Authorization, Accounting) embodiment. For the purpose of illustration, and not by way of limitation, in FIG. 1 the cdma2000 specification is used as a representative cellular network 2 architecture. In the architecture of FIG. 1, the WLAN 1 access and cdma2000 network 2 access are independently managed, and no peering relationship (such as common ownership or roaming agreement) is assumed to exit between them. A non-limiting example of this type of arrangement is a WLAN hot spot in a bookstore that charges access fees to a user readership account. Another example would be an enterprise WLAN, which only employees of the enterprise are authorized to access (i.e., there are no access fees for the employees). Or, in some cases, WLAN access at a hot spot could be free of charge, and hence, no local AAA functionality is required at the WLAN. This could be the case for a WLAN hot spot in, as an example, a small restaurant. On the other hand, cdma2000 cellular access would typically always be charged to a user's subscription account with the (home) cellular operator.

In the illustrated example there are a plurality of domains 5 in each of the WLAN 1 and the cdma2000 network 2. For example, the WLAN 1 includes a home agent domain 6, and a WLAN AAA function 7 connected via an access router (AR) 8 to WLAN Access Points 9. The cdma2000 network 2 can include an AAA function 10 located in the Home Operator Network, as well as a local AAA function 11 in a Visited cdma2000 network, connected via a PDSN (Packet Data Support Node) 12 to an IMT-2000 Radio Network 13. The MN 3 is assumed to handoff from the WLAN 1 to the cdma2000 network 2 via the WLAN Access Points 9 and the IMT-2000 Radio Network 13.

Figure 2:
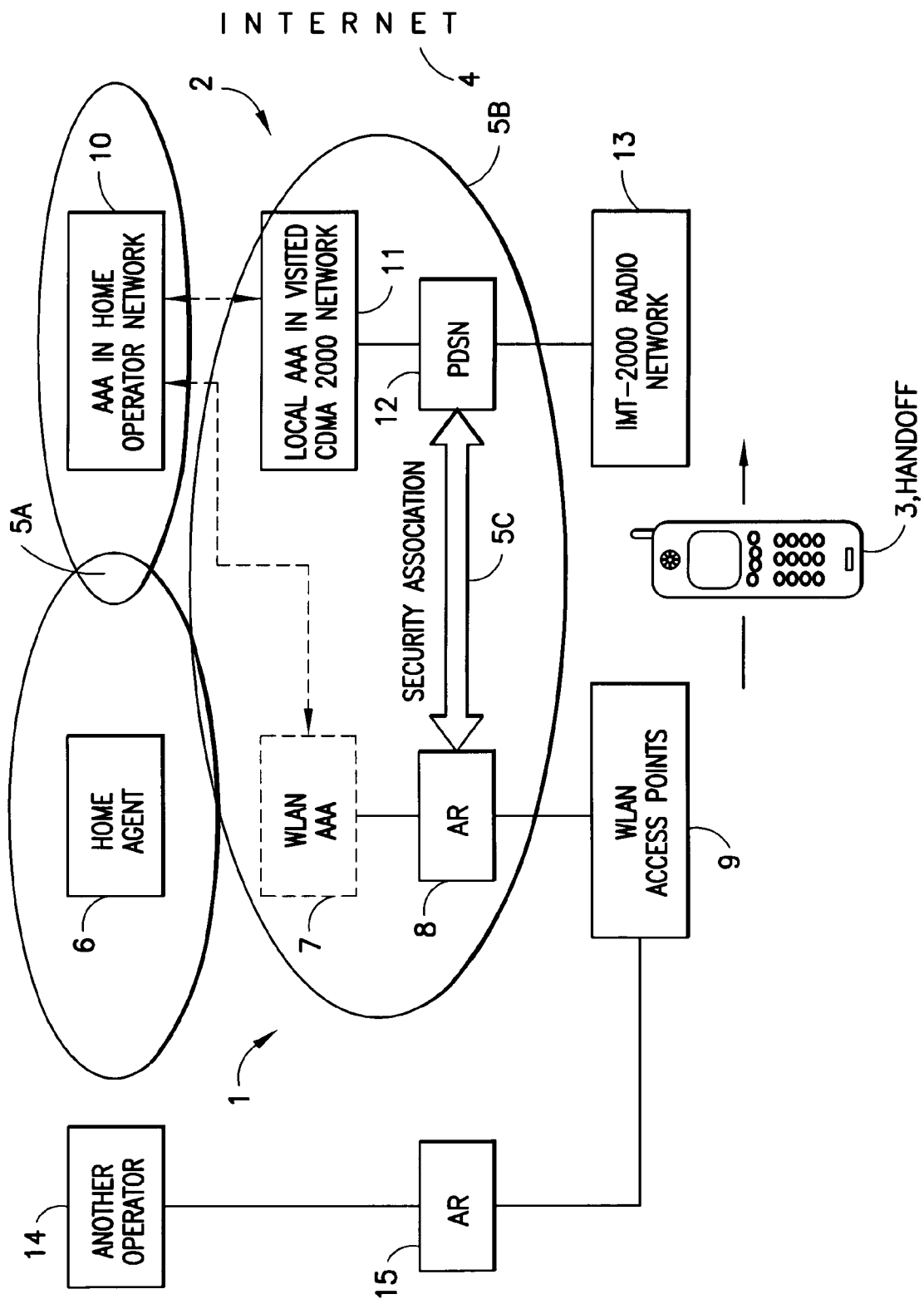
FIG. 2 is a simplified block diagram of a second, less preferred, embodiment of a reference network architecture, and is illustrative of another suitable type of multi-technology wireless system architecture in which this invention can be deployed to advantage.

FIG. 2 shows another network deployment embodiment, referred to as a shared AAA architecture. Here, a trusted relationship is assumed to exist between the WLAN 1 and the cdma2000 network 2. Note in this embodiment the overlapping domains 5A and 5B. This embodiment may exist, for example, if WLAN hot spot access is operated by the cdma2000 operator. Alternatively, a roaming agreement may exist between the WLAN 1 operator and the cdma2000 network 2 operator. Thus, at the time of inter-technology handoff, the authentication and authorization performed with the WLAN 1 can be reused for the cdma2000 2 access as well. Further, a security association 5C may exist between the AR 8 in the WLAN 1 and the PDSN 12 in the cdma2000 network 2. For completeness, there is shown outside of the trusted WLAN/cellular network arrangement another operator 14 having an access router 15 connected to the WLAN Access Points 9.

Of most interest to the teachings of this invention is the independent network architecture shown in FIG. 1. However, it should be noted that the handoff method of this invention can be adapted for use as well in the shared deployment model of FIG. 2.

Referring again to FIG. 1, consider a handoff from the WLAN network 1 to the cdma2000 network 2. In this environment, assume that the mobile user initiates an Internet 4 session, such as a voice over IP (VoIP) call or a multimedia conferencing call, from the WLAN 1, and later moves away from the WLAN hot spot coverage area. Before attempting an inter-technology handoff from the WLAN 1 to the wide area cdma2000 network 2, the MN 3 should first perform authentication and authorization procedures with the cdma2000 network 2. Note that the home agent 6 for MN 3 may reside in the same realm as that of the WLAN 1 (e.g., in the enterprise case), or in the same realm as that of the home operator network 2, or in a completely different realm (e.g., in the bookstore or free access case).

In addition, a number of procedures, including those for IP access and quality of service (QoS) setup, should be performed before the MN 3 can exchange IP packets with the Internet 4 via the cdma2000 access network 2. These include procedures for setting up a PPP (Point to Point Protocol) connection with the PDSN 12, Mobile IP procedures, and procedures for setting up access network bearers with appropriate QoS characteristics in the cdma2000 network 2.

The latency in performing these procedures should be minimized to avoid a service disruption at the time of handoff from the WLAN 1 to the cdma2000 network 2, such as a handoff that occurs during an ongoing session, such as a VoIP session, or a multimedia streaming session, or a gaming session. This invention provides a technique to efficiently and quickly perform an inter-technology handoff that avoids the problems inherent in the prior art.

In general, the performance of the handoff can be considerably improved if at least some of the handoff messaging is performed proactively, i.e., while the MN 3 still sees a strong signal from the WLAN Access Point 9. These proactively performed steps may include, for example, fast handoff signaling, authenticating with the cellular network 2, and informing the cellular network 2 about QoS and other requirements of current MN 3 application(s). Then, as soon as the WLAN signal strength diminishes, the MN 3 is enabled to send a final trigger to the cellular network 2 to complete the handoff process (i.e., to actually commit the radio resources, arrange for packet rerouting, and perform any other necessary procedures to complete the handoff).

It should be noted that it is generally not possible to reliably perform this task based on MN 3 signal strength measurements alone. For example, if the proactive handoff procedures are initiated after the WLAN signal strength begins to decline noticeably, the MN 3 Internet connectivity may be disrupted before these steps are completed. On the other hand, if the handoff procedures are initiated too early (when the WLAN signal is still strong), it may result in large number of false starts. In other words, the mobile user may actually never leave the coverage area of the WLAN 1, even though the proactive handoff steps have begun. This may create an unnecessary signaling burden on the cellular network 2.

Figure 3:
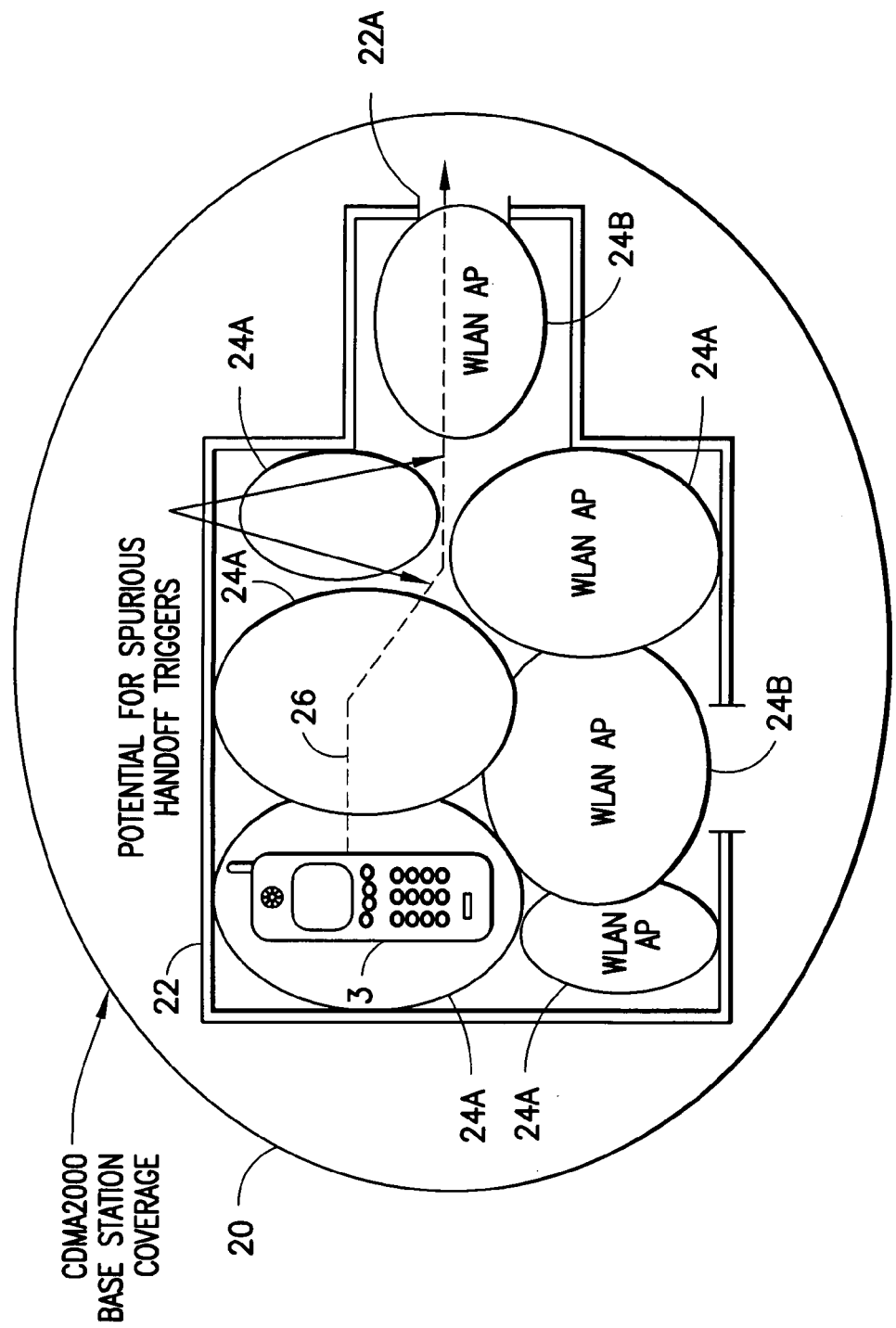
FIG. 3 illustrates a typical indoor WLAN environment that lies within the coverage area of a cellular network.

Reference is made to FIG. 3 for showing an exemplary WLAN/cellular network environment, such as may be encountered within a hotel or other type of building. In FIG. 3 is can be seen that a cellular network (e.g., a cdma2000 network) base station coverage area (footprint) 20 encompasses a structure 22 containing a plurality of WLAN access point (AP) coverage areas (footprints) 24.

In addition to providing an inter-technology handoff technique that can be cleanly partitioned into proactive and reactive steps, this invention provides a method to anticipate the need for a handoff from the WLAN 1 to the cellular network 2, with sufficient time for the execution of proactive handoff steps. In this regard handoff trigger mechanisms are desired for initiating Phase 1 and Phase 2 aspects of the handoff technique (the Phase 1 and Phase 2 operations are described in detail below).

A signal strength criterion, among others, can be used to generate handoff triggers, and the signal strength criterion may be employed to generate the ultimate handoff trigger. However, in the context of WLAN to cdma2000 handoff, this approach provides an opportunity for generating spurious handoff triggers. To further explain, consider the handoff scenario depicted in FIG. 3, which shows the WLAN footprint in a hot spot, which in this case is the indoor environment such as a hotel (structure 22). The areas 24A and 24B indicate strong signal footprints of different WLAN APs located at the hot spot. Note that the WLAN 1 geographical coverage area is subsumed in cdma2000 network 2 geographical coverage area, as typically is the case. Assume that a mobile user having a multi-radio (e.g., dual-mode WLAN and cdma2000) MN 3 initiates an Internet session over the WLAN access, and then walks along the path 26. Along the path 26, when the user arrives at locations where WLAN signal strength drops due to local factors such as metal objects, walls, etc., the MN 3 detects a drop in WLAN signal strength, but still detects a strong cellular signal. In these cases the MN 3 would attempt to initiate a handoff from the WLAN 1 to the cellular network 2. However, seconds or moments later the MN 3 again detects a strong signal from the WLAN 1 and, hence, initiates handoff back to the WLAN network 1. Such a ping-pong effect is undesirable as it causes unnecessary signaling traffic, as well as possibly causing more disruption to the user's service than what would have been caused due to a momentary lack of the WLAN signal. Of course, the MN 3 could wait for a short time after the loss of the WLAN signal before initiating handoff to the cellular network 2. However, this approach degrades the (latency) performance of the handoff when the user actually exits from the structure 22 through the door 22A and, hence, actually loses connectivity to the WLAN network 1.

As such, while a signal strength criterion may be employed to initiate the inter-technology handoff, and to generate the final WLAN/cellular network handoff, those skilled in the art should realize that other considerations and criteria, such as packet error rate and/or the number of requests for retransmission generated per unit of time, as well as other signal quality-related parameters, may be employed instead of, or in conjunction with, the use of the signal strength received at the MN 3.

Another technique that is more presently preferred for performing proactive handoff control relies on the use of "border bits", i.e., information provided by border access nodes that provide geographical coverage or region information for use by a mobile node in controlling the initiation of a handoff from one technology network to another technology network. Reference in this regard can be made to U.S. Provisional Patent Application No.: 60/426,385, entitled "Smart Inter-Technology Handover Control", by H. Chaskar et al., incorporated by reference herein in its entirety.

Described now is a handoff procedure, with specific reference to the cdma2000 network 2 architecture, that operates in accordance with this invention.

Figure 4:
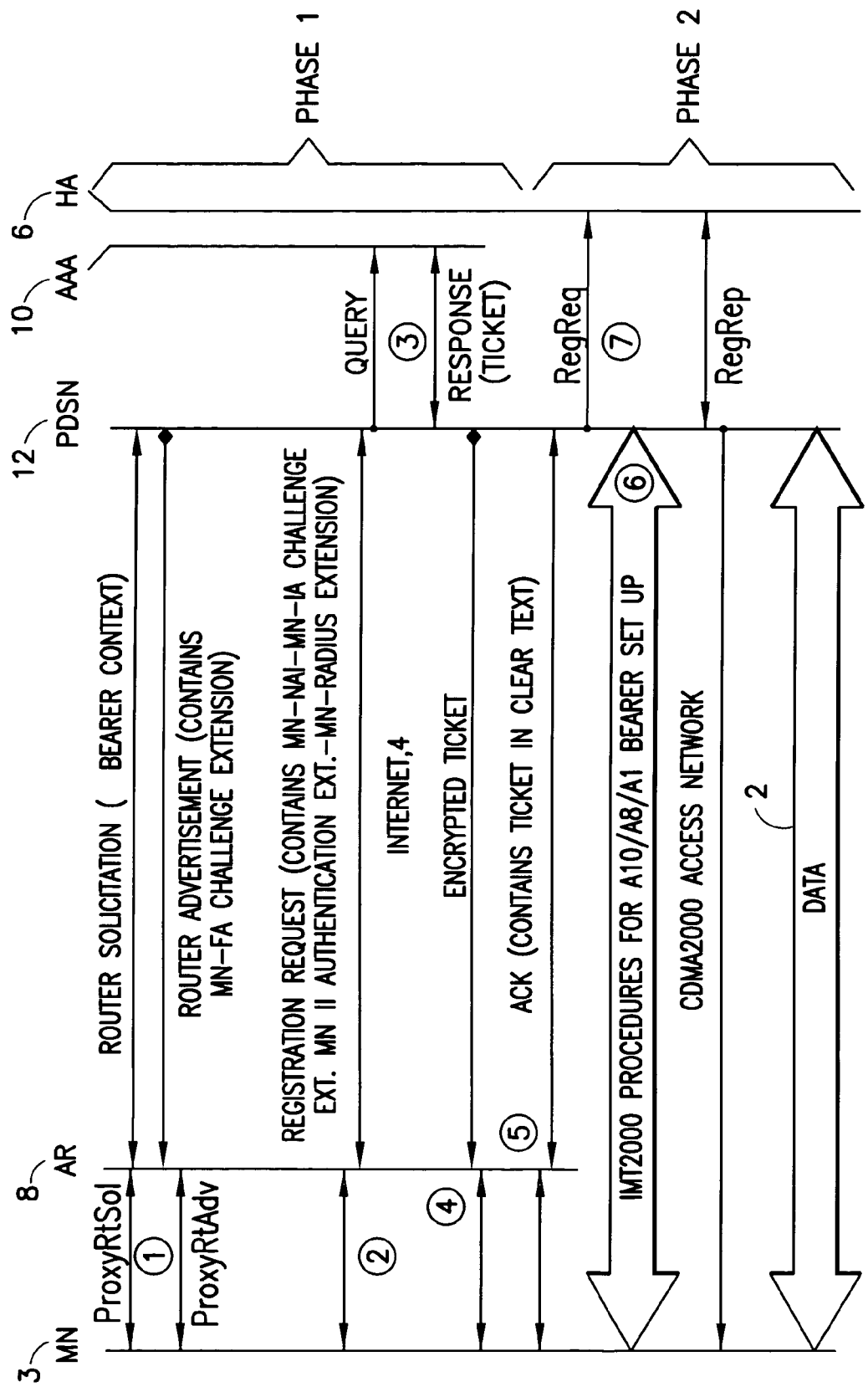
FIG. 4 is a message diagram showing MN, WLAN and cellular network inter-technology handoff signal flow in accordance with an aspect of this invention.

First described is a handoff procedure that is adapted to Low Latency Mobile IPv4 (IETF MobileIP Working Group: "Low latency Mobile IPv4 and Fast Mobile IPv6 specifications", www.ietf.org) in a "pre-registration" mode. This mode is useful, as Mobile IPv4 has been incorporated in the cdma2000 specifications. The corresponding signaling scheme is shown in FIG. 4. The adaptation of the invention to Fast Mobile IPv6 (in the "anticipated handoff" mode) is conceptually similar, and a description for this embodiment is also provided below.

Referring now also to FIG. 4, after the MN 3 determines to initiate an inter-technology handoff from the WLAN 1 to the cdma2000 network 2 (based on whatever suitable parameter(s) are employed, such as signal strength and/or signal quality and/or the use of border bits), it sends, by a wireless connection, a Proxy Router Solicitation (ProxyRtSol) to an AR 8, which in turn sends, via the Internet 4, a Router Solicitation to the PDSN 12. In addition, the MN 3 arranges to transfer what is referred to herein as a "Bearer Context" message to the PDSN 12 via the AR 8. The Bearer Context message contains parameters for use in establishing access network bearers in the cdma2000 network 2 for the ongoing Internet session(s) of the MN 3. The Bearer Context message can be sent from the MN 3 to the AR 8 piggybacked on the ProxyRtSol, or piggybacked on another message, or it can be sent as a separate message. From the AR 8 to the PDSN 12 the Bearer Context message can be piggybacked on a Router Solicitation message, or it can be sent in a separate message. The Bearer Context message includes at least one or more of the following, or similar or equivalent information:

- the QoS requirement of the MN's ongoing application(s), such as one or more of the desired bandwidth, reliability and latency characteristics,
- the MSID: Mobile Station Identity recognizable by the cdma2000 network 2, e.g., the IMSI (International Mobile Subscriber Identity) of the MN 3,
- LCP (Link Control Protocol) configuration parameters such as MRU (Maximum Receive Unit), ACCM (Async Character Control Map) and a link quality monitoring protocol to be used, to facilitate the creation of PPP state in the PDSN 12,
- TFT (Traffic Flow Templates) to enable establishment of packet filters in the PDSN 12, and any other desired service parameters, such as a requested security level.

The foregoing parameters that comprise the Bearer Context message are not to be read in a limiting sense. For example, it is also within the scope of this invention to also provide, or to provide in lieu of one of the foregoing parameters, other parameters that request resources from the cellular network 2, such as a location tracking service and/or a transcoding service for use in certain packet sessions.

The PDSN 12 responds to the Bearer Context message with a Router Advertisement message that is forwarded to the MN 3 via the Internet 4 and the AR 8 (as a Proxy Router Advertisement or ProxyRtAdv). The ProxyRtAdv contains, among other items, a challenge (e.g., a Mobile Node-Foreign Agent (MN-FA) challenge extension) for authentication and authorization purposes.

The MN 3 responds by sending a Registration Request (RegReq) message to the PDSN 12 via the AR 8 (shown as step 2 in FIG. 4). This message contains, among other items, the MN 3 network address identifier (MN-NAI) that identifies the home AAA 10 of the MN 3, authentication data to be used for registering with the HA 6, and the response (MN-Radius extension) calculated over the MN-FA challenge received in the ProxyRtAdv for the purpose of authentication and service authorization with the cdma2000 network 2. It should be noted that the Bearer Context message can be piggybacked on this message as well, if it is not sent earlier.

Upon the receipt of the Registration Request, the PDSN 12 uses the NAI extension to determine the home AAA domain of the MN 3, and issues a query to the identified home AAA 10 of the MN 3. In the preferred embodiment the PDSN 12 actually queries the local (visited) AAA 11 in the cdma2000 access network 2. The visited AAA 11 then forwards the query to the home AAA 10 of the MN 3, possibly via one or more intermediate broker AAAs. The PDSN 12 supplies the home AAA 10 with the challenge issued by the PDSN 12 in the MN-FA challenge extension, and the reply of the MN 3 to it obtained in the MN-Radius extension. The PDSN 12 also provides the home AAA 10 with the description of the access service (e.g., the QoS) requested by the MN 3. Upon a successful authentication and service authorization, the home AAA 10 sends to the PDSN 12 (this response would typically follow the same path as that of the query, but in a reverse direction) a success indication authorizing the access by the MN 3. The home AAA 10 also sends a "ticket" to the PDSN 12 in clear text, as well as in encrypted form. The ticket is encrypted using the shared secret between the home AAA 10 and the MN 3. These procedures are shown as step 3 in FIG. 4.

As shown in step 4, the PDSN 12 stores the ticket in a clear text form and sends the encrypted copy to the MN 3 via the AR. The PDSN 12 also sends in this message any configuration parameters for the MN 3. At this point one may consider that a first phase (Phase 1) of the inter-technology handoff process is completed.

The second phase (Phase 2) of the inter-technology handoff process is initiated when the MN 3 sends an acknowledgment (ACK) to the PDSN 12 via the AR 8, and includes the ticket in clear text form with the ACK (step 5 of FIG. 4), thereby proving to the PDSN 12 that the ACK indeed originated from the MN 3. This is a security measure that is useful to avoid denial of service (DOS) attacks where malicious nodes spoof the ACK, causing the burden of false bearer set up on the cdma2000 network 2.

It should be noted that there can be a time delay between the completion of Phase 1 and the start of Phase 2. This would occur if the MN 3 begins Phase 1 while the WLAN signal is still quite strong (but fading) in the hope of completing Phase 1 before losing connectivity with the Internet 4. Phase 2 would typically begin when the MN 3 is about to leave the WLAN coverage area 24. After sending the ACK, the MN 3 simply waits to hear from the cdma2000 network 2.

While the MN 3 is waiting, the cdma2000 network 2 performs A10/A8/A1 bearer setup (step 6 of FIG. 2), as described in the "Network Initiated Bearer Setup" chapter of the cdma2000 specification, 3GPP2 Access Network Interfaces Interoperability Specification (3G-IOS v4.0.1) Release A (1999) Revision 0, 3GPP2 #A.S0001-0.1). In addition, in step 7 the PDSN 12 performs a registration with the HA 6 of the MN 3. Upon receiving a Registration Reply (RegRep) from the HA 6, the PDSN 12 forwards it to the MN 3 upon one of the established access bearers.

As another embodiment of the procedure in step 4 of FIG. 4, the home AAA 10 may generate a session key and forward it to the PDSN 12 as clear text, as well as in encrypted form (e.g., using a shared secret between the MN 3 and the home AAA 10). The PDSN 12 stores the clear text key, and forwards the encrypted version to the MN 3 (via the PDSN 12 and AR 8). The MN 3 may then use this key to authenticate or encrypt future message transactions with the PDSN 12 (e.g., ACK).

Now described is a technique to adapt the foregoing handoff embodiments to the Fast Mobile IPv6 environment (IETF MobileIP Working Group: "low latency Mobile IPv4 and Fast Mobile IPv6 specifications", www.ietf.org). In this approach communication between the AR 8 and the PDSN 12 in step 1 of FIG. 4 is performed via a HI/HACK (Handover Initiate/Handover ACK) message exchange, and in this embodiment it is desirable to piggyback the Bearer Context message and the MN-FA challenge on the HI and the HACK messages, respectively. In this case a new message may be used to implement step 2, wherein the MN 3 sends responses for authenticating and authorizing with the cdma2000 network 2. Such a message is not specified as yet in the Fast Mobile IPv6 protocol, as the design of this protocol assumes a solid security association between the AR 8 and the PDSN 12. In step 4, another new message may be used to send the ticket to the MN 3, while the ACK in step 5 can be sent to the AR 8 using a F-BU (Fast Binding Update) message with the ticket piggybacked on it. Another new message can be used the AR 8 to send the indication to the PDSN 12 to start step 6. In step 6, the PDSN 12 does not perform registration with the HA 6. Further, a temporary tunnel is preferably established between the AR 8 and the PDSN 12 until the MN 3 performs a binding update.

While described above in the context of certain presently preferred embodiments, it should be realized that the practice of this invention is not limited to only these embodiments. For example, the Bearer Context can be sent by the MN 3 in context transfer signaling. Further by example, and as was mentioned above, other service specification parameters, in addition to those mentioned above, may be included in the Bearer Context message, such as location tracking services and transcoding services for certain packet sessions. Further by example, the Bearer Context message can be encrypted using the shared secret between the MN 3 and the home AAA 10. This may be useful to prevent compromising privacy over the AR 8 to PDSN 12 path. When the PDSN 12 receives the encrypted Bearer Context, it passes it on to the home AAA 10 in a query. The home AAA 10 deciphers the encrypted Bearer Context and sends it to the PDSN 12 in a response.

Also, it should be appreciated that this invention encompasses computer program code embodied on or in a tangible medium for directing one or more data processors to implement the various steps of the methods discussed above. These data processors can be resident in at least the MN 3 and the PDSN 12, or in an equivalent cellular network node and function.

While described in the context of a WLAN/cdma2000 cellular network, it should be appreciated that these teachings have applicability as well to other types of wireless systems, and the teachings of this invention have applicability as well to, for example, digital TDMA and FDMA systems. Furthermore, while described in the context of various specific messages, message names and message types, it should be realized that these are exemplary, and are not to be construed in a limiting sense upon the practice of this invention. For example, the message sent from the MN 6 is referred to for convenience as the Context Bearer message, but could be referred to by another name.

What is claimed is:

1. A method to perform a low latency inter-technology handoff of a mobile node (MN) from a wireless local area network (WLAN) to a cellular network, comprising:

transmitting a message from the MN to the WLAN for use by the cellular network, the message comprising information for use in establishing at least one access bearer with the cellular network for an ongoing packet data session of the MN being conducted through the WLAN; and responding to the receipt of the message with a Router Advertisement message that is forwarded towards the MN.

2. A method as in claim 1, where the message is piggybacked on another message.

3. A method as in claim 1, where the message comprises information expressive of a QoS requirement of at least one ongoing application of the MN.

4. A method as in claim 1, where the message comprises information expressive of a unique identity of the MN that is recognizable by the cellular network.

5. A method as in claim 1, where the message comprises information expressive of parameters to facilitate the creation of a Point-to-Point Protocol state in the cellular network.

6. A method as in claim 1, where the message comprises information expressive of parameters to enable establishment of packet filters in the cellular network.

7. A method as in claim 1, where the message is piggybacked on a Router Solicitation message that is sent from an access router (AR) in response to receiving a Proxy Solicitation Request message from the MN.

8. A method as in claim 7, where the Router Advertisement is sent to the AR, which in response sends a Proxy Router Advertisement to the MN.

9. A method as in claim 8, where the Router Advertisement comprises a challenge for authentication and authorization purposes.

10. A method as in claim 8, where the MN responds to the Proxy Router Advertisement by sending a Registration Request message to the cellular network.

11. A method as in claim 10, where the Proxy Router Advertisement comprises a challenge for authentication and authorization purposes, and where the Registration Request message comprises information for identifying a home Authentication, Authorization, Accounting (AAA) function of the MN in the cellular network, and a response to the challenge received in the Proxy Router Advertisement.

12. A method as in claim 11, where, in response to receiving the Registration Request message, a query is sent to the home AAA of the MN.

13. A method as in claim 12, where the query is sent via a visited AAA either directly or via at least one intermediate broker AAA.

14. A method as in claim 12, where the query sent to the home AAA comprises information that indicates the challenge sent to the MN, and the response to the challenge received from the MN, for use by the home AAA in authenticating the MN.

15. A method as in claim 14, where the query sent to the home AAA comprises information that indicates the access service requested by the MN.

16. A method as in claim 14, further comprising, in response to successfully authenticating the MN, sending a success indication from the home AAA for authorizing access by the MN.

17. A method as in claim 16, where the success indication further comprises a ticket sent in clear text and in a form encrypted using a shared secret between the home AAA and the MN.

18. A method as in claim 17, where the clear text form of the ticket is stored in a cellular network node and where the encrypted ticket is sent to the MN via the AR.

19. A method as in claim 18, further comprising sending an acknowledgment (ACK) from the MN to the cellular network, the ACK comprising the clear text ticket.

20. A method as in claim 19, in response to receiving the clear text ticket from the MN, further comprising performing access bearer setup in the cellular network for establishing at least one access bearer for the MN.

21. A method as in claim 20, further in response to receiving the clear text ticket from the MN, registering the MN with the HA and, upon receiving a Registration Reply from the HA, forwarding the Registration Reply from the cellular network to the MN upon an established access bearer.

22. A method as in claim 17, further comprising generating a session key at the home AAA as clear text and in an encrypted form, using the shared secret between the MN and the home AAA, storing the clear text session key in a cellular network node, and forwarding the encrypted form of the session key to the MN for use by the MN in at least one of authenticating and encrypting future message transactions with the cellular network.

23. A method as in claim 1, where the message is sent by the MN in an encrypted form using a shared secret between the MN and a home Authentication, Authorization, Accounting (AAA) function of the MN in the cellular network.

24. A method as in claim 1, where communication between the MN and the cellular network comprises a HI/HACK (Handover Initiate/Handover ACK) message exchange, and where the message is piggybacked on the HI message.

25. A method as in claim 24, where the cellular network responds to a receipt of the message with a Mobile Node-Foreign Agent (MN-FA) challenge extension that is piggybacked on the HACK message.

26. A method as in claim 1, where the MN transmits the message in response to a change in at least one of WLAN-related signal strength, signal quality and other information.

27. A data communications system comprising a mobile node (MN), a wireless local area network (WLAN) and a cellular network, further comprising:

a transmitter for transmitting a message from the MN to the cellular network via the WLAN, the message comprising information for use in establishing access bearers in the cellular network for an ongoing packet data session of the MN being conducted through the WLAN; and a unit to respond to the receipt of the message with a Router Advertisement message that is forwarded towards the MN.

28. A system as in claim 27, where the message is piggybacked on another message.

29. A system as in claim 28, where the message is piggybacked on a Router Solicitation message that is sent from an access router (AR) in response to receiving a Proxy Solicitation Request message from the MN.

30. A system as in claim 28, where communication between the MN and the cellular network comprises a HI/HACK (Handover Initiate/Handover ACK) message exchange, where the message is piggybacked on a HI message, and where the cellular network responds to a receipt of the message with a Mobile Node-Foreign Agent (MN-FA) challenge extension that is piggybacked on a HACK message.

31. A system as in claim 27, where the message comprises information expressive of at least one of a QoS requirement of at least one ongoing application of the MN, a unique identity of the MN that is recognizable by the cellular network, parameters to facilitate the creation of a Point-to-Point Protocol state in the cellular network, and parameters to enable establishment of packet filters in the cellular network.

32. A system as in claim 27, where the message is received by a Packet Data Support Node (PDSN).

33. A computer program embodied on a computer-readable medium for controlling operation of a mobile node (MN) that is operable with a wireless local area network (WLAN) and a cellular network, said computer program being responsive to a change in at least one of received WLAN signal strength and signal quality for transmitting a message from the MN to the cellular network via the WLAN, the message comprising information for use in establishing at least one access bearer in the cellular network for an ongoing packet data session of the MN being conducted through the WLAN.

34. A computer program as in claim 33, where the message is piggybacked on another message.

35. A computer program as in claim 34, where the message is piggybacked on a Router Solicitation message that is sent from an access router (AR) in response to receiving a Proxy Solicitation Request message from the MN.

36. A computer program as in claim 34, where communication between the MN and the cellular network comprises a HI/HACK (Handover Initiate/Handover ACK) message exchange, where the message is piggybacked on a HI message, and where the cellular network responds to a receipt of the message with a Mobile Node-Foreign Agent (MN-FA) challenge extension that is piggybacked on a HACK message.

37. A computer program as in claim 33, where the message comprises information expressive of at least one of a QoS requirement of at least one ongoing application of the MN, a unique identity of the MN that is recognizable by the cellular network, parameters to facilitate the creation of a Point-to-Point Protocol state in the cellular network, and parameters to enable establishment of packet filters in the cellular network.

38. A computer program embodied on a computer-readable medium for controlling operation of a network node of a cellular network, said computer program being responsive to a receipt of a message from a mobile node (MN) that is currently wirelessly coupled to a wireless local area network (WLAN) for initiating the establishment of a cellular network access bearer for the MN, the message comprising information for use in establishing the at least one access bearer in the cellular network for an ongoing packet data session of the MN being conducted through the WLAN.

39. A computer program as in claim 38, where the cellular network node comprises a packet data support node (PDSN).

40. A computer program as in claim 39, where the cellular network comprises a cdma2000 cellular network.

41. A computer program as in claim 38, where said cellular network node responds to the receipt of the message by sending a Router Advertisement message that comprises a Mobile Node-Foreign Agent challenge extension message towards the MN.

42. A method as in claim 26, where the other information comprises geographical coverage information.

43. A method to perform a low latency inter-technology handoff of a mobile node (MN) from a wireless local area network (WLAN) to a cellular network, comprising:

transmitting a message from the MN to the WLAN for use by the cellular network, the message comprising information for use in establishing at least one access bearer with the cellular network for an ongoing packet data session of the MN being conducted through the WLAN, the information comprising information expressive of a QoS requirement of at least one ongoing application of the MN and information expressive of a unique identity of the MN that is recognizable by the cellular network; and responding to the receipt of the message with a response message that is forwarded to the MN, the response message comprising a challenge for authenticating the MN in the cellular network.

* * * * *